(12) United States Patent
Shibata et al.

(10) Patent No.: US 6,530,638 B2
(45) Date of Patent: Mar. 11, 2003

(54) IMAGE PROCESSING APPARATUS, PRINTING APPARATUS AND STORAGE MEDIUM

(75) Inventors: Tsuyoshi Shibata, Kanagawa (JP); Noribumi Koitabashi, Kanagawa (JP); Masataka Yashima, Tokyo (JP); Hitoshi Tsuboi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/987,505

(22) Filed: Nov. 15, 2001

(65) Prior Publication Data

US 2002/0097294 A1 Jul. 25, 2002

(30) Foreign Application Priority Data

Nov. 17, 2000 (JP) ........................................ 2000/352002

(51) Int. Cl.⁷ ................................................ B41J 2/205
(52) U.S. Cl. ............................ 347/15; 347/43; 358/3.1
(58) Field of Search ........................... 347/15, 43, 100; 358/1.9, 3.01, 3.1, 501, 502

(56) References Cited

U.S. PATENT DOCUMENTS

| 4,313,124 A | 1/1982 | Hara ........................... 347/57 |
| 4,345,262 A | 8/1982 | Shirato et al. ................. 347/10 |
| 4,459,600 A | 7/1984 | Sato et al. |
| 4,463,359 A | 7/1984 | Ayata et al. .................... 347/56 |
| 4,558,333 A | 12/1985 | Sugitani et al. ................. 347/65 |
| 4,723,129 A | 2/1988 | Endo et al. ..................... 347/56 |
| 4,740,796 A | 4/1988 | Endo et al. ..................... 347/56 |
| 5,852,454 A | * 12/1998 | Kanematsu et al. ........... 347/43 |

FOREIGN PATENT DOCUMENTS

| JP | 59123670 | 7/1984 |
| JP | 59138461 | 8/1984 |

\* cited by examiner

Primary Examiner—Lamson Nguyen
(74) Attorney, Agent, or Firm—Fitzpatrick, Cella, Harper & Scinto

(57) ABSTRACT

In an image printed by a printing apparatus, graininess particularly in a light part of the printed image is reduced by relatively simple structure by using a second color. To do so, magenta and cyan color component data in image data is subjected to under color removal to generate image data of a blue ink being the secondary color. On the basis of the data of the blue ink replaced for magenta and cyan, printing is performed by forming dots of the blue ink. At this time, black data is distributed into dark black and light black by density distribution, and the light black is substituted by the blue and yellow inks, whereby it is possible by the simple structure to prevent the graininess appeared when the cyan and magenta dots mutually appear biasedly and the graininess due to the black ink dots.

25 Claims, 11 Drawing Sheets

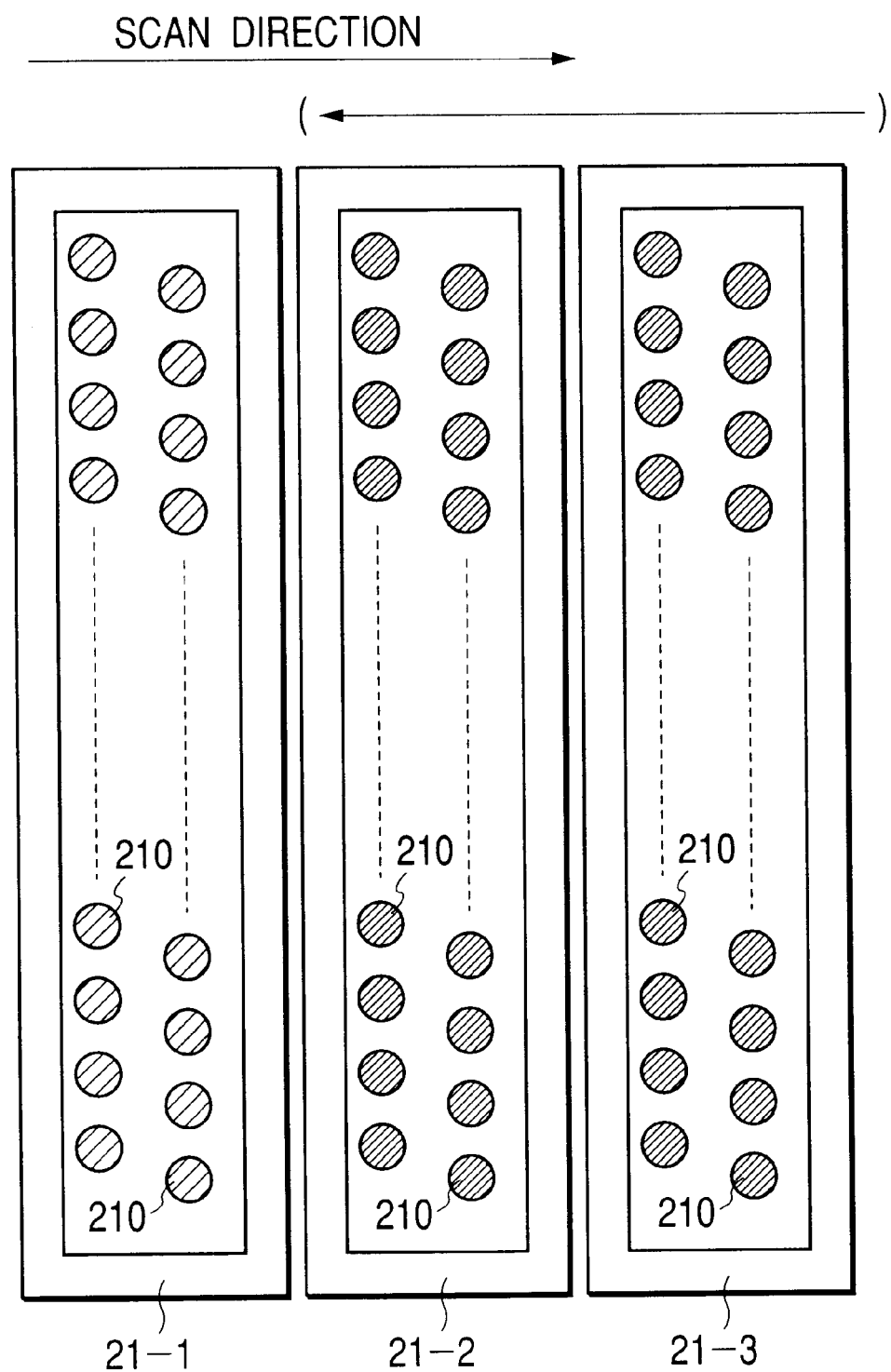

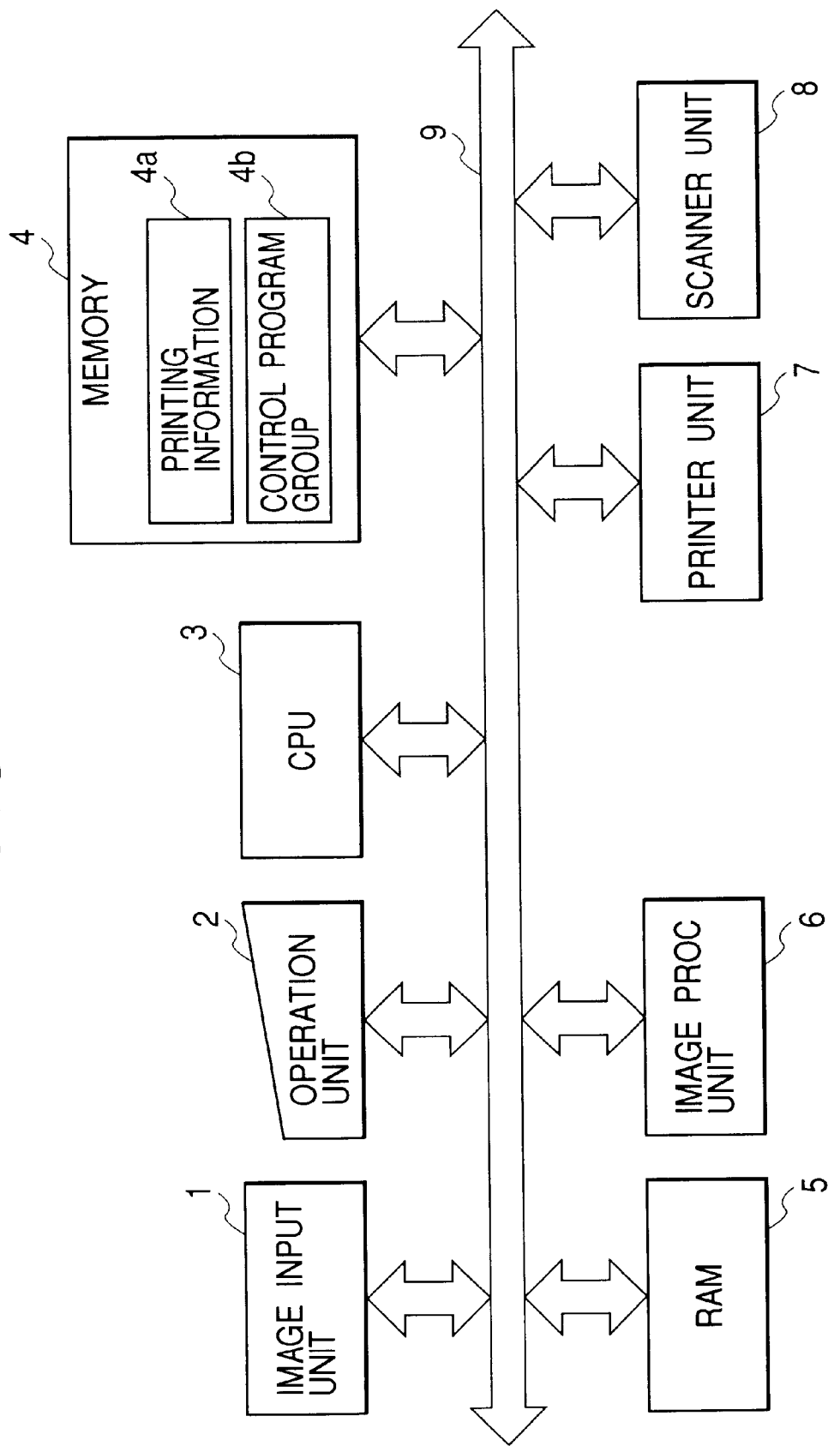

FIG. 4A
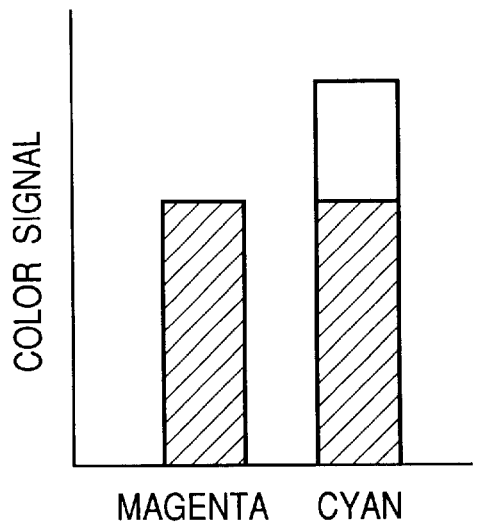
FIG. 4B
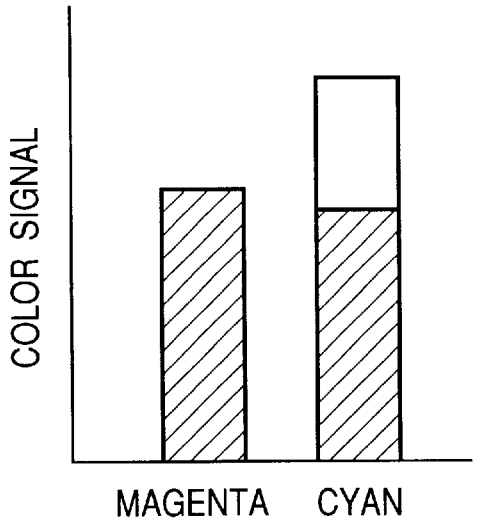
FIG. 4C
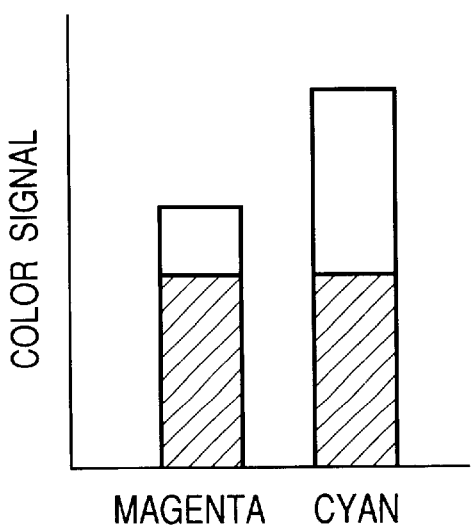
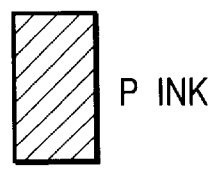 P INK
L (M INK) < L (P INK)
L (C INK) < L (P INK)
RELATION OF INK DOT LIGHTNESS

| Y(i, j)=120<br>Y'(i, j)=160 | Y(i+1, j)=60<br>Y'(i+1, j)=100 |
|---|---|
| Y(i, j+1)=50<br>Y'(i, j+1)=50 | Y(i+1, j+1)=48<br>Y'(i+1, j+1)=20 |

| Y"(i, j)=280 | Y"(i+1, j)=160 |
|---|---|
| Y"(i, j+1)=100 | Y"(i+1, j+1)=68 |

FIG. 8A

| C(i, j)=56<br>M(i, j)=94 | C(i+1, j)=60<br>M(i+1, j)=100 |
|---|---|
| C(i, j+1)=50<br>M(i, j+1)=50 | C(i+1, j+1)=48<br>M(i+1, j+1)=20 |

FIG. 8B

| C'(i, j)=0<br>M'(i, j)=38<br>P(i, j)=56 | C'(i+1, j)=0<br>M'(i+1, j)=40<br>P(i+1, j)=60 |
|---|---|
| C'(i, j+1)=0<br>M'(i, j+1)=0<br>P(i, j+1)=50 | C'(i+1, j+1)=28<br>M'(i+1, j+1)=0<br>P(i+1, j+1)=20 |

FIG. 11A

| C(i, j)=56<br>M(i, j)=94 | C(i+1, j)=60<br>M(i+1, j)=100 |
|---|---|
| C(i, j+1)=50<br>M(i, j+1)=50 | C(i+1, j+1)=48<br>M(i+1, j+1)=20 |

FIG. 11B

| P(i, j)=56 | P(i+1, j)=60 |
|---|---|
| P(i, j+1)=50 | P(i+1, j+1)=20 |

FIG. 11C

| P(i, j)=255 | P(i+1, j)=0 |
|---|---|
| P(i, j+1)=0 | P(i+1, j+1)=0 |

FIG. 11D

| C'(i, j)=−199<br>M'(i, j)=−161<br>P(i, j)=255 | C'(i+1, j)=60<br>M'(i+1, j)=100<br>P(i+1, j)=0 |
|---|---|
| C'(i, j+1)=50<br>M'(i, j+1)=50<br>P(i, j+1)=0 | C'(i+1, j+1)=48<br>M'(i+1, j+1)=20<br>P(i+1, j+1)=0 |

FIG. 11E

| C'(i, j)=0<br>M'(i, j)=0<br>P(i, j)=1 | C'(i+1, j)=0<br>M'(i+1, j)=0<br>P(i+1, j)=0 |
|---|---|
| C'(i, j+1)=0<br>M'(i, j+1)=0<br>P(i, j+1)=0 | C'(i+1, j+1)=0<br>M'(i+1, j+1)=0<br>P(i+1, j+1)=0 |

IMAGE PROCESSING APPARATUS, PRINTING APPARATUS AND STORAGE MEDIUM

BACKGROUND OF THE INVENTION

1. Field of the Invention

The present invention relates to reduction of graininess in a case where color printing is performed by using plural kinds of coloring agents of different colors.

It should be noted that the present invention is applicable to all machines which perform printing by using a printing media such as a paper sheet, a cloth, a leather, a nonwoven fabric, an OHP sheet, a metal and the like. As the concrete machines to which the present invention is applicable, for example, business machines such as a printer, a copying machine, a facsimile machine and the like, and industrial-production machines such as a printing machine, a printing press and the like can be cited.

2. Related Background Art

As information processing machines such as a copying machine, a word processor, a computer and the like, and communication machines have been widespread, for example, an ink-jet printing apparatus has been also widespread as one of apparatuses for printing and outputting information to be processed by these machines. In the printing apparatus of such a type, a printhead on which plural ink discharge nozzles are integrally arranged is generally used to increase printing speed. Further, recently, a printing apparatus which uses printheads respectively for different colors has been widespread to cope with color printing.

In such an ink-jet printing method, ink being a recording liquid is discharged from an ink discharge outlet of the printhead, the discharged ink is hit against the printing medium such as a sheet or the like, a dot is formed by the hit ink, and the printing is thus performed. This method has an advantage of low noise because such a noncontact printing system as above is adopted. Further, a nozzle arrangement on the printhead can be easily made dense, whereby it is possible to achieve forming of a higher-resolution printed image and higher-speed printing. Also, this method has an advantage that colorization can be easily achieved by relatively simple head structure, whereby the apparatus itself can be minimized and simplified. In addition, any special process such as development, fixation or the like need not be performed to the printing medium such as a common sheet or the like, and a high-quality image can be thus obtained cheaply. Since there are such a lot of advantages, the ink-jet printing method is the printing method widely widespread in recent years. Besides, also making of high resolution and speed-up have been required more and more along with such the colorization.

Incidentally, particularly in the ink-jet printing method, when a color image is printed by using inks of three colors (i.e., C (cyan), M (magenta) and Y (yellow) inks) or inks of four colors (i.e., C, M, Y and K (black) inks), several methods have been known so as to try to form a multigradation image.

One of these methods has been adopted in a lot of conventional printers. In this method, the size of dots to be formed on a sheet by discharged ink is constant, and the gradation of the image to be printed is represented by changing dot density (a dot appearance frequency for each unit area). In another method, dot density for each unit area is made variable by adjusting the diameter of dots to be formed on a sheet.

Recently, since micromanipulation technology of the head forming ink droplets has advanced, the number of dots capable of being formed for a predetermined length (i.e., dot density (dpi: dots per inch)), a variable range of the dot diameter and the like have improved every year. However, in the ink-jet printer, printing density (i.e., resolution) has stagnated to about 300 dpi to 1200 dpi and an ink droplet diameter has stagnated to about several tens of microns. That is, the expressiveness of the ink-jet printer is still lagged behind as compared with a silver bromide camera (it is said that resolution of several thousand dots per inch can be obtained on a film).

In case of the ink-jet printer, the dots are sparsely formed particularly in the area where the density is low in the image to be printed, i.e., the area where the density of the dots to be formed is low, whereby the image that so-called graininess stands out might be formed. Even if the density in the printing is constant, the positions where the dots are formed are generally different from others according to a binarization method such as a dither method or the like. Besides, the states that the dots are scattered are also different from others. For this reason, even if the dots are sparsely formed in the area where the dot density is low, there is a case where the dots are formed comparatively biasedly and thus the dots might not be uniformly distributed. In this case, the above graininess becomes especially remarkable.

Of course, irrespective of such a dot distribution, the graininess becomes remarkable as optical reflection density of the formed dots becomes higher or lightness thereof becomes lower.

With respect to such problems of the graininess as above, conventionally, a binarization process, e.g., a halftone process for the printer, has been devised for the problem of the bias of dot distribution. Concretely, the graininess has been reduced by not biasing the dot distribution for each color as much as possible in the area where the printing density is low.

Further, it has taken countermeasures, such as simple use of a low-density ink (e.g., dyes), against the basic problem of the graininess due to the high optical reflection density of the dots.

However, there is a case where the graininess of the dots still stands out even if such the conventional countermeasures as above are adopted. That is, with respect to the former problem, even if the binarization process is devised not to bias the dot distribution when the color printing is performed, such the binarization process itself is performed independently for each color. Thus, there is a case where a viewer feels the graininess because, e.g., the respective dot distributions of cyan and magenta mutually appear biasedly. For such a problem, a trial not to mutually bias the dot distributions of cyan and magenta has been performed, but the reduction of the graininess does not suffice when the dot diameter is relatively large.

Further, with respect to the latter problem, the method of reducing the graininess by using the low-density ink such as the dyes or the like naturally means that a low-density ink must be prepared besides each color ink, whereby there is some fear that costs of the printing apparatus resultingly increase.

SUMMARY OF THE INVENTION

The present invention has been made to solve the above conventional problems, and an object thereof is to provide an image processing method which can reduce graininess on a printed image by using a secondary color with relatively simple structure, a printing apparatus which uses this method, and a storage medium which stores a program to execute this method.

In order to achieve the above object, the present invention provides an image processing method which generates, based on data to be printed, printing data of plural different coloring agents used in a printing apparatus, the method comprising:

a step of generating first data of a secondary color for predetermined two of the plural different coloring agents based on the data to be printed, generating second data of the secondary color based on printing data of light black obtained for a black coloring agent being one of the plural different coloring agents, and thus generating printing data of the secondary color by synthesizing the first data and the second data; and a step of generating printing data in which at least a part of the printing data of the predetermined two coloring agents has been replaced by the generated printing data of the secondary color.

Further, another aspect of the present invention provides a printing apparatus which performs printing on the basis of printing data of plural different coloring agents generated based on data to be printed, the apparatus comprising:

printing means for performing the printing of respective colors by using the plural different coloring agents, on the basis of the printing data; and supply means for supplying, to the printing means, the printing data which is generated by a secondary color generation process of generating first data of a secondary color for predetermined two of the plural different coloring agents based on the data to be printed, generating second data of the secondary color based on printing data of light black obtained for a black coloring agent being one of the plural different coloring agents, and thus generating printing data of the secondary color by synthesizing the first data and the second data, and a data generation process of generating printing data in which at least a part of the printing data of the predetermined two coloring agents has been replaced by the generated printing data of the secondary color.

As described above, the printing data of the secondary color is generated for the predetermined two coloring agents among the plural different kinds of coloring agents used in the printing apparatus, the printing data in which the part of the printing data of the predetermined two coloring agents has been replaced by the generated printing data of the secondary color is generated, the printing data is generated at least to use the above secondary color instead of the light black coloring agent (i.e., the black coloring agent of which black density is low), and the printing is performed on the basis of these generated printing data. Therefore, even if the data to be printed should be essentially printed by using the dots formed by the predetermined two coloring agents, at least the part of such the printing can be performed by using the secondary color. Further, the area which should be essentially printed by the light black coloring agent can be printed by the above secondary color. Thus, particularly in the low-density part or the high-lightness part of the image to be printed, it is possible to reduce the area where the dots of the predetermined coloring agents are formed mutually biasedly. Also, the secondary color can be substituted in the printing of the light black part of the image.

BRIEF DESCRIPTION OF THE DRAWINGS

FIG. 2 is a front view showing an ink discharge outlet face of an ink-jet head used in the ink-jet printer;

FIG. 3 is a block diagram showing the structure of a control system of the ink-jet printer;

FIGS. 4A, 4B and 4C are diagrams for explaining generation of blue ink data according to the embodiment of the present invention;

FIGS. 8A and 8B are diagrams showing the generation of the blue ink data of FIG. 7 for each pixel;

FIGS. 11A, 11B, 11C, 11D and 11E are diagrams showing the generation of the blue ink data and accompanying generation of cyan and magenta ink data for each pixel, according to the fourth embodiment of the present invention.

DETAILED DESCRIPTION OF THE PREFERRED EMBODIMENTS

Hereinafter, the embodiments of the present invention will be explained in detail with reference to the attached drawings.

Figure 1:
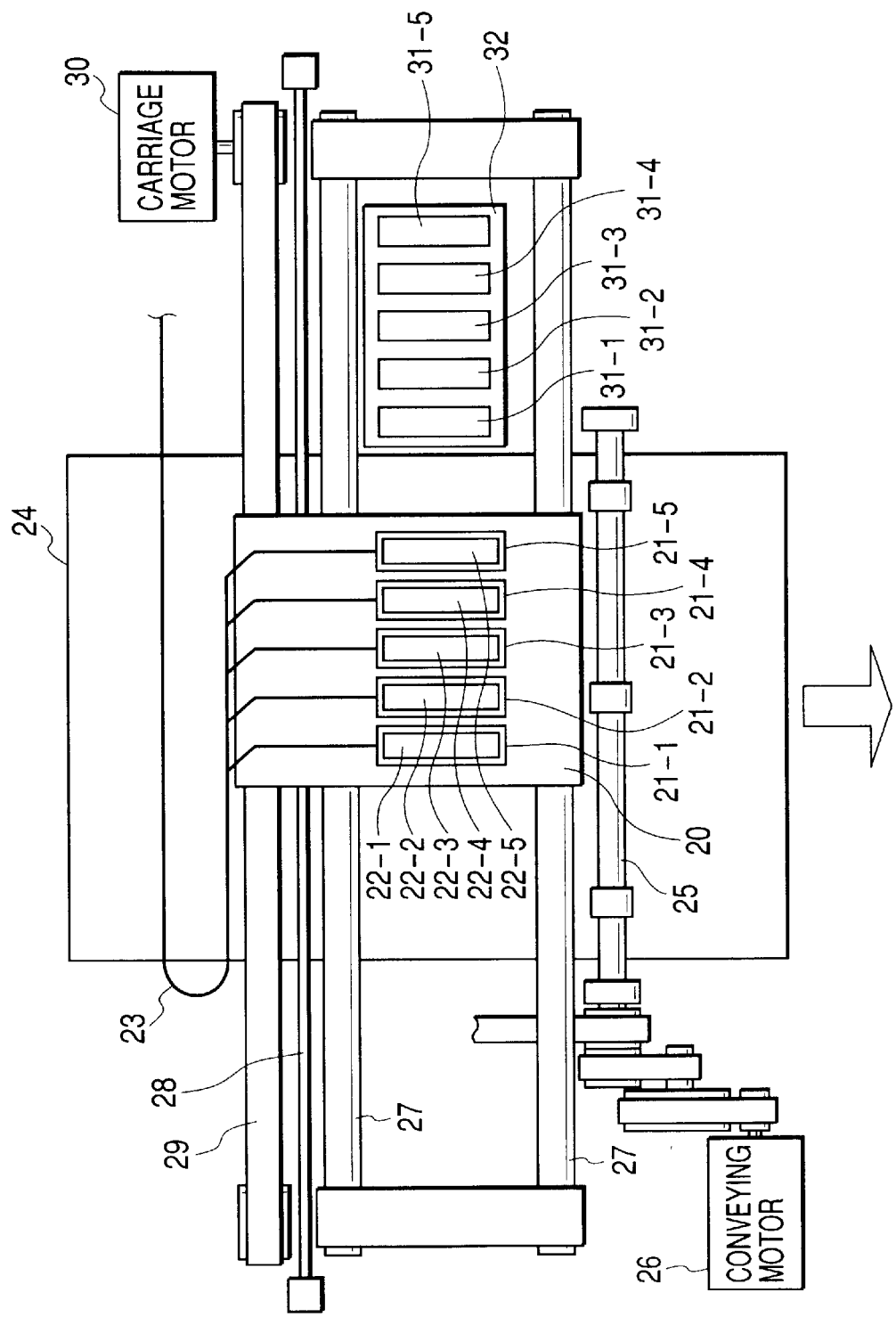
FIG. 1 is a plan view showing the schematic structure of an ink-jet printer according to an embodiment of the present invention.

FIG. 1 is a plan view showing the schematic structure of an ink-jet printer according to the one embodiment of the present invention.

Plural ink-jet heads 21-1 to 21-5 (also simply called heads 21-1 to 21-5 hereinafter) are mounted on a carriage 20, and plural ink discharge outlets for discharging ink are arranged at a predetermined pitch on each ink-jet head. The heads 21-1, 21-2, 21-3, 21-4 and 21-5 are the ink-jet heads for discharging a printability improvement (P) ink, a black (K) ink, a cyan (C) ink, a magenta (M) ink and an yellow (Y) ink, respectively. In the embodiment, the printability improvement ink is an ink which has a hue of blue being a secondary color of cyan and magenta. As described later, the printability improvement ink is discharged on the basis of data generated from printing data of cyan and magenta by a predetermined process and data generated from printing data of black by a predetermined process. Thus, graininess which appears particularly in a low-density part on a printed image can be improved, whereby the phrase "printability improvement" is used in this point of view.

Each head is manufactured unitarily together with an ink tank which contains the ink to be supplied to this head, so as to structure each of ink cartridges 22-1 to 22-5. These ink cartridges are detachably mounted on the carriage 20. It should be noted that, of course, the structure of the head and the structure of the ink tank are not limited to the above. For example, it is possible to adopt the structure that each of the head and the ink tank is independently manufactured and detachably mounted on the carriage.

The carriage 20 equipped with the ink cartridges can be scanned along two guide shafts 27 by driving force of a carriage motor 30 transmitted through a belt 29. Here, it should be noted that, in the present application, the term "scan" is used to indicate the same meaning as the term "shift". On the other hand, a control signal such as a printing image signal or the like is sent from a printer control unit (later described in FIG. 3) to each head through a flexible cable 23. At this time, if the carriage 20 is shifted, each color head is scanned on a printing medium 24 and thus can perform printing by discharging the ink in response to the printing image signal during such the scan. As the printing medium 24, a common sheet, a high-quality printing-dedicated sheet, an OHP sheet, a gloss sheet, a gloss film, a postcard or the like can be used. In FIG. 1, the printing medium 24 is intermittently conveyed toward the direction indicated by the arrow by a predetermined quantity with use of a not-shown conveying roller and a sheet discharge roller 25, during the above head scan. The not-shown conveying roller and the sheet discharge roller 25 are rotatively driven by driving force of a conveying motor 26 transmitted through a predetermined transmission mechanism, whereby the printing medium 24 can be conveyed. The scan position of each head is detected by a linear encoder 28, whereby, e.g., ink discharge timing of each head can be adjusted or controlled on the basis of a detection signal obtained by the linear encoder 28.

Each of the ink-jet heads 21-1 to 21-5 is equipped with an exoergic element (an electrothermal conversion element) for generating thermal energy, a bubble is generated in the ink by using the generated thermal energy, and thus the ink is discharged by pressure of the generated bubble.

A recovery unit 32 equipped with caps 31-1 to 31-5 is provided at the home position of the carriage 20 outside the scan area of the heads. While the printing is not performed, the shifted carriage 20 is set to the home position, whereby the ink discharge outlet faces of the heads 21-1 to 21-5 are covered with the caps 31-1 to 31-5 respectively to prevent ink solvents from evaporation. Thus, ink fixing or an increase of ink viscosity due to the evaporation of the ink solvents are prevented. Further, by such capping, foreign matter such as dust or the like can be prevented from adhering to the ink discharge outlet face, whereby clogginess by such the foreign matter can be also prevented. Further, in a capping state, so-called suction recovery can be performed. In the suction recovery, the ink held in the head is sucked therefrom through a discharge outlet by a not-shown pump, whereby a discharge state of the discharge outlet with possibility to cause defective ink discharge can be recovered. Further, each head can perform, to the cap, so-called preparatory discharge which is not directly relative to the printing, whereby, for example, defective discharge and clogginess in the discharge outlet with low discharge frequency can be canceled. Further, a not-shown blade is provided adjacent to the recovery unit 32, whereby the ink discharge outlet face of the head can be cleaned off by the blade when the head is shifted.

FIG. 2 is a front view schematically showing the ink discharge outlet faces of the ink-jet heads 21-1, 21-2, 21-2, . . . .

As shown in FIG. 2, each of the ink-jet heads 21-1 to 21-5 has two lines of ink discharge outlets 210. The ink discharge outlets 210 are aligned at the density of, e.g., 300 dpi on each line, and an alignment pitch of one line is set to be off from that of the other line by ½, whereby the discharge outlet arrangement of the density corresponding to, e.g., 600 dpi is secured as a whole.

Each head is substantially structured by a base plate and a cover plate. That is, the above electrothermal conversion element (i.e., a heater) for each discharge outlet, an electrode wiring for applying an electrical pulse to the heater, a driving element for switching and changing various signals on the electrode wiring, and the like are formed on the base plate. On the other hand, apertures acting as the ink discharge outlets 210 of FIG. 2, divisions or partitions forming liquid paths corresponding to the apertures, and a division or a partition forming a common liquid chamber with which these liquid paths are jointly communicated are formed on the cover plate. Then, the main part of the head is formed by bonding the above-structured base and cover plates together. That is, the heater is provided for the liquid path communicated with the ink discharge outlet, and the ink is supplied from the common liquid chamber to the liquid path based on the ink discharge, whereby the ink can be discharged by the generation of the bubble. Here, growth of the bubble can be adjusted by changing and thus controlling, e.g., the voltage of the electrical pulse to be applied to the heater, whereby also the volume of the ink droplet to be discharged from the discharge outlet can be controlled. Besides, a further effective structure that the electrical pulse is divided into a pre-pulse for performing heating to extent where any bubble is not generated and a main-pulse for performing heating to generate the bubble can be provided. Thus, a quantity of the ink to be discharged can be changed within a relatively large range by driving the heater on the basis of the plural pulses including the pre-pulse and the main-pulse.

It should be noted that the ink-jet printing method to which the embodiment is applicable is not limited to such an above bubble-jet (BJ) method using the above exoergic element (i.e., the heater). For example, in a continuous method of continuously discharging and graining ink droplets, an element of charge control type, an element of divergence control type and the like can be used. Further, in an on-demand method of discharging, as well as the BJ method, ink droplets according to the necessity, an electro-mechanical conversion element such as a piezoelectric element or the like can be used. Further, the embodiment is not applied only to the ink-jet method. For example, the present invention is applicable in a case where graininess appears on an image printed in an electrophotographic method.

FIG. 3 is a block diagram showing the structure of a control system of the above ink-jet printer.

In FIG. 3, numeral 1 denotes an image data input unit which is used to input image data from a personal computer or the like being a host apparatus, numeral 2 denotes an operation unit which is used by a user to perform various operations to the printer, numeral 3 denotes a CPU which performs an entire process for the printer, and numeral 4 denotes a memory which stores various data. In the memory 4, symbol 4a denotes a printing information storage memory which stores printing information concerning printability improvement liquid (ink), and symbol 4b denotes a control program group memory which stores various control program groups. Further, numeral 5 denotes a RAM which is used as a working area or the like when the various processes are performed by the CPU 3, numeral 6 denotes an image processing unit which performs an image process or the like concerning the printability improvement ink explained in FIG. 4 and the following, and numeral 7 denotes a printer unit which outputs prints. Numeral 8 denotes a scanner unit which reads an original and the like to be printed, and also reads predetermined patches printed by the printer of the embodiment in case of calibration for the head. Numeral 9 denotes a bus which is used to transfer the various data among the above elements.

When further explaining in detail, the image input unit 1 is used to input gradation image data from image input apparatuses such as a scanner, a digital camera and the like, and gradation image data from a personal computer. The operation unit 2 is equipped with various keys which are used by the user to set various parameters, instruct printing start, and the like. The CPU 3 controls the apparatus of the embodiment as a whole in accordance with various programs stored in the control program group memory 4b of the memory 4, and also controls the process of the image processing unit 6 concerning later-described production of the printability improvement liquid (ink). The memory 4 stores the programs (e.g., the above control programs and error processing programs) and the like used to operate the printer, and can be structured by a ROM, an FD (floppy disk), a CD-ROM, an HD (hard disk), a memory card, a magnetooptical disk or the like. The RAM 5 is used as the working area in case of executing the various programs as described above, and also can be used as a temporary escape area in an error process and a working area in an image process. Further, after copying various tables of the memory into the RAM 5, it is possible to change the contents of the copied tables and thus perform the image process as referring to the changed contents of the tables.

The image processing unit 6 quantizes the input gradation image data for each pixel into multivalue image data, and creates a discharge pattern corresponding to a gradation value "T" represented by the quantized multivalue image data. In the embodiment, the gradation image data represented by eight bits (i.e., 256 gradation levels) is quantized into the printing image data of binary (T=2), and a discharge pattern that the ink is discharged or not discharged according to "1" or "0" indicated by the obtained binary data is obtained.

In the embodiment, an error diffusion method is used to the process of converting the gradation image data into the multivalue data (called a multivalue process hereinafter), but the present invention is not limited to this. That is, an arbitrary pseudo-gradation processing method such as an average density preservation method, a dither matrix method or the like can be used. Finally, by repeating the above multivalue process the number of times corresponding to the number of all the pixels on the basis of density information of the image, a binary driving signal representing discharge and non-discharge for each pixel to be supplied to the ink discharge outlet is generated.

The printer unit 7 discharges the ink on the basis of the discharge pattern created by the image data processing unit 6, and thus forms the printing image on the printing medium by dots made by the discharged inks. The printer unit 7 corresponds to the structure shown in FIG. 1.

Next, the generation of the printing data for the above printability improvement ink (also called a P ink hereinafter) and the actual printing based on the generated printing data will be explained.

(First Embodiment)

In the present embodiment, with respect to cyan data and magenta data, a part of these data is replaced by blue data representing the secondary color (blue) of cyan and magenta, thereby forming the dots. Thus, a blue ink is used as the P ink. Similarly, as the P ink, an ink representing red being the secondary color of magenta and yellow, an ink representing green being the secondary color of yellow and cyan, or an ink of a hue of orange, purple or the like including the color components of the secondary color may be used. Also, an ink including each of cyan, magenta and yellow components may be used. In the present embodiment, in order to simplify the printing data generation process, and in consideration of the fact that the yellow ink does not relatively affect the graininess because the lightness of yellow is relatively high, the ink of blue being the secondary color of cyan and magenta is used. If a tint of the dots formed by the blue ink does not correspond to a tint achieved by superposition or mixture of the dots formed respectively by the cyan and magenta inks, as described later, adjustment is performed by using weighting coefficients when the printing data for the blue ink is generated based on the gradation image data of cyan and magenta.

Further, the blue ink functioning as the P ink is also used to dot formation based on light black data obtained by a later-described dark/light distribution table for the black data.

FIGS. 4A, 4B and 4C are diagrams for explaining a process to generate a blue signal on the basis of a cyan component signal and a magenta component signal.

In the drawings, the parts indicated by the slants are the color component by which the cyan and magenta components are replaced and which is subjected to printing by the blue ink (P ink) corresponding to the secondary color component. That is, basically, the gradation image data as the cyan signal and the gradation image data as the magenta signal are mutually compared, the value of the gradation image data of which gradation value is smaller is subtracted from the respective gradation values, and the obtained results are set as the respective gradation values. Further, a process to make the smaller gradation value the gradation value of blue is performed. In an example shown in FIG. 4A, the gradation value of magenta wholly is replaced by the gradation value of blue (P ink), whereby the gradation value of magenta is given by 0. On the other hand, the new gradation value of cyan is given by the blank part obtained by subtracting the part of the slants.

As above, with respect to the image which is represented by the superposition or the mixture of the cyan-ink dots and the magenta-ink dots, the secondary-color part of this image is replaced by the blue-ink dots, and then the obtained image is actually printed. Thus, it is possible to reduce the possibility that the respective dot distributions of cyan and magenta mutually appear biasedly in the low-density part of the image, whereby it is possible to reduce the graininess which appears in the case where the dots of different colors are mutually distributed biasedly.

Further, in the present embodiment, the lightness of the dots formed by the blue ink is set to be higher than the lightness of the dots formed by the cyan ink or the magenta ink of which lightness is higher, or the optical reflection density of the dots formed by the blue ink is set to be lower than the optical reflection density of the superposition or the mixture of the cyan-ink dots and the magenta-ink dots. This can be achieved by using the blue ink which actualizes such the lightness or the optical reflection density, or instead or therewith limiting the magnification of the gradation value of the blue ink generated in the image process. Thus, it is further possible to reduce the graininess due to the blue-ink dots themselves, as well as such an effect as above.

That is, it has been known that the graininess on the printed matter increases or decreases in accordance with the lightness of ink dots. For example, since the lightness of yellow is high, the graininess on the yellow dots is less than the graininess on the cyan or magenta dots. Thus, the present embodiment aims to reduce the graininess due to the dots themselves by making the dot lightness high with use of the blue ink. Further, the low optical reflection density of the dots is preferable to reduce the graininess, whereby the blue ink of which optical reflection density is lower than that of the cyan-ink and magenta-ink dots is used.

It should be noted that, simply, if the ink dots are formed entirely on the printing medium and measured, the lightness of the dot can be compared with the lightness of the other kind of dot. Although influenced by the printing resolution of the printer and the size of the ink dot, generally, the dots can be entirely formed by so-called solid printing of which printing duty is 100%.

As above, when the gradation value data of the blue ink is generated, if the color of the thus printed image includes, e.g., blue which is biased to either cyan or magenta, the weighting as described above is performed. In this case, if the formed blue is biased to cyan, as shown in FIG. 4B, a weighting coefficient is determined so that more color components are distributed from magenta (i.e., more than the actual gradation value of magenta) to the blue ink. On the other hand, if the formed blue represents the tint which is biased to magenta, as shown in FIG. 4C, a weighting coefficient is determined so that relatively less color components are distributed from magenta to blue when the gradation value of magenta is smaller than that of cyan.

It should be noted that to heighten the lightness or lower the optical reflection density when generating the gradation data of the blue ink as above is to lower the coloring agent density of the P ink, whereby it is possible to obtain a significant effect that the possibility of a trouble in the ink discharge such as the increase of ink viscosity or the like can be reduced.

Further, the gradation image data of black is distributed into the data for the dark ink and the data for the light ink through predetermined dark/density distribution, and the above blue ink is used in correspondence with the thus obtained data for the light ink.

Figure 5:
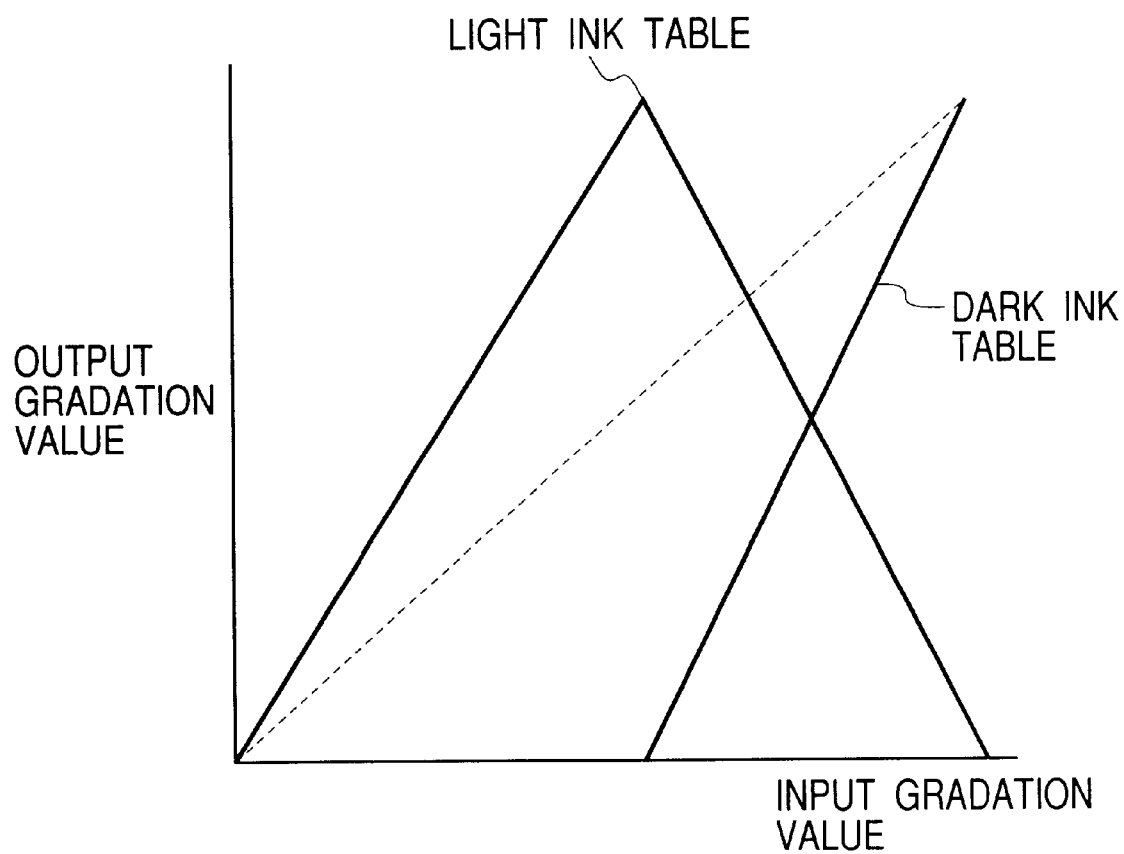
FIG. 5 is a graph schematically showing a dark/light distribution table according to the embodiment.

FIG. 5 is a graph schematically showing the dark/light distribution table. In FIG. 5, the doted line indicates the content of the table in a case where the gradation image data is not distributed into the data for the dark ink and the data for the light ink. On the other hand, in the dark/light distribution table, the content of the table is changed on the boundary of, e.g., the center value of the gradation image data of black (i.e., the input gradation value in FIG. 5). That is, only the light ink is used for the input of the value smaller than the center value to satisfy the relation that the maximum output gradation value can be obtained on the center value. Further, for the input of the value greater than the center value, a quantity of use of the light ink is linearly reduced gradually, while the dark ink is gradually increased to obtain the output image.

The gradation value data of the blue ink is generated basically on the basis of the output gradation value of the light ink obtained by the above dark/light distribution table. However, since the tint of the dots formed by the light ink of black is generally different from the tint of the dots formed by the blue ink, the yellow ink is used besides the blue ink in the present embodiment. Concretely, the gradation values of the blue and yellow inks are respectively made the output gradation value for the light ink obtained by the above dark/light distribution table, whereby the respective gradation image data can be generated. In this case, if the tint achieved by the blue and yellow dots is different from the tint achieved by the supposed light black ink, a weighting coefficient is applied to the gradation data of yellow or the gradation data of both yellow and blue to obtain the matched tint.

As above, the blue ink functioning as the P ink is used as the ink representing the secondary color of cyan and magenta and is also used as the substitution of the black light ink. Thus, since the blue ink is used to represent the secondary color, the possibility that the respective dot distributions of cyan and magenta mutually appear biasedly and thus cause the graininess can be reduced. Further, when the graininess due to the black-ink dots is reduced by using the light ink, it is unnecessary to newly prepare the light black ink, whereby it is possible to reduce the graininess with simple structure.

The above-explained generation of the gradation image data of the blue ink is performed during the image process of generating the printing image data. As well as an ordinary image process, the gradation image data for each of the divided cyan (C), magenta (M), yellow (Y) and black (K) components is input, and the input gradation image data is processed by the image processing unit 6 as described later. Of course, the image data for the printability improvement (P) ink is not yet prepared at the time when the gradation image data for each color component is input.

In the following, it should be noted that the cyan ink, the magenta ink, the yellow ink, the black ink and the printability improvement ink will be also called C, M, Y, K and P respectively to simplify the explanation.

First, the image data of C and the image data of M are sequentially compared for each pixel data C(x, y) and M(x, y) to be processed, and basically the image data (of C or M) of which gradation value is smaller is made the image data of P. Here, it is assumed that "x" indicates the position of the image to be printed on the printing medium in the head scan direction shown in FIG. 1, and "y" indicates the position of the image in the printing medium conveying direction.

In this case, as described above, on the basis of the density of the dots formed by the P ink on the printing medium, the maximum value of a replacement quantity of cyan or magenta which is to be replaced by the P ink is previously set to obtain the lightness for these dots equal to or greater than the predetermined lightness or to obtain the optical reflection density for these dots equal to or less than the predetermined optical reflection density. Therefore, if the replaced image data of P has the value greater than the set maximum value, the replacement quantity is limited to this maximum value.

Similarly, if the color of the image printed by the P ink is biased to cyan or magenta as described above, the weighting coefficient is used in the replacement process according to such the color, and the replacement quantity for each of the gradation values of C and M is set.

By the above process, it is possible to produce C' and M' by subtracting the image data of P and the gradation value corresponding to the print by the P ink respectively from the gradation image data of C and M.

Next, in the generation of the gradation image data for the blue ink and the yellow ink corresponding to the light black ink, pixel data K(x, y) is distributed by the dark/light distribution table into the data K(x, y) for the dark black ink (i.e., the black ink having an ordinary coloring agent density) and data K'(x, y) for the light black ink (i.e., the ink having a coloring agent density lighter than that of the above dark black ink). Then, the obtained light black data is processed by using the weighting coefficient to generate data P' for the blue ink and data Y' for the yellow ink.

Figure 6:
FIGS. 6A and 6B are diagrams schematically showing data synthesis for each pixel according to the embodiment.

Then, a synthesizing process to synthesize P and P' being the data for the blue ink and synthesize Y and Y' being the data for the yellow ink is performed. In case of yellow, the synthesizing process can be performed by simply adding Y and Y' for each pixel shown in FIG. 6A together and thus obtaining synthesized data Y" shown in FIG. 6B.

Then, the synthesized data is converted into multivalue data (i.e., binary data in the present embodiment). Here, for example, in such a multivalue process using the error diffusion method, an eight-bit data process may be performed as a nine-bit data process. Further, in case of pixel-sequentially performing the process, the data exceeding eight bits may be sequentially diffused as errors into adjacent pixels. Similarly, P and P' can be synthesized to obtain synthesized data P".

In case of the above data generation, if the color in the image formed by using the P ink is influenced by the Y component, a process to change the Y image data may be performed.

Next, the thus generated image data of C', M', Y", K and P" are binarized in the error diffusion method. Here, these image data can be binarized in not only the error diffusion method but also any pseudo-gradation processing method such as a dither matrix method or the like. Further, the multivalue process is not limited to the binarization process. That is, if the printing apparatus has a structure by which the size of an ink dot or the gradation of ink dots can be controlled at two or more levels, an appropriate multivalue process according to such a kind of printing apparatus can be performed.

It should be noted that generally an ink-jet printing apparatus is used as the printing apparatus which is appropriately used in the present embodiment and can perform the printing on the printing medium.

In the ink-jet printing method, the present embodiment brings a significant effect particularly in a recording head and a recording apparatus which adopt a method that a means (e.g., an electrothermal converter, a laser or the like) for generating thermal energy used to discharge ink is provided to cause a state change of the ink by the generated thermal energy, because high-density and high-accuracy recording can be achieved by such the method.

With respect to the representative structure and principle of such the method, it is preferable to refer to the basic principle disclosed in, e.g., U.S. Pat. No. 4,723,129 or No. 4,740,796. This method is applicable to both so-called on-demand type and continuous type. Particularly, in the on-demand type, at least one driving signal which corresponds to recording information and brings a rapid temperature rise exceeding nuclear boiling is applied to an electrothermal converter which is arranged in correspondence with a sheet and a liquid path where liquid (ink) is held so as to cause the electrothermal converter to generate thermal energy and cause film boiling on the thermal action face of a recording head, whereby a bubble on-to-one corresponding to the driving signal can be resultingly generated in the liquid (ink). Thus, the on-demand type is effective. Then, the liquid (ink) is discharged through a discharge aperture by growth and shrinkage of the bubble, whereby at least one ink droplet is formed. If the driving signal is made to have a pulse shape, the growth and shrinkage of the bubble can be rapidly and appropriately performed, whereby it is more preferable because the discharge of the liquid (ink) particularly excellent in responsiveness can be achieved. As the driving signal having the pulse shape, the signal as disclosed in U.S. Pat. No. 4,463,359 or No. 4,345,262 is suitable. Further, if the condition disclosed in U.S. Pat. No. 4,313,124 directed to the invention concerning a temperature rise rate on the thermal action face is adopted, further excellent recording can be achieved.

As the structure of the recording head, in addition to the above structure in which the discharge outlets, the liquid paths and the electrothermal converters are combined (i.e., a linear liquid flowing path or a right-angle liquid flowing path), a structure in which the structure disclosed in U.S. Pat. No. 4,558,333 or No. 4,459,600 showing the structure that the thermal action face is arranged in the bent or inflexed area is included in the present invention. Besides, even if a structure based on the structure shown in Japanese Patent Application (Laid-Open) No. 59-123670 that the shared slit is used as the discharge unit for the plural electrothermal converters or the structure shown in Japanese Patent Application (Laid-Open) No. 59-138461 that the aperture for absorbing the pressure wave of thermal energy is made correspondent to the discharge unit is adopted, the effect of the present invention is available. That is, even if the recording head has any shape, the recording can be surely and effectively performed according to the present invention.

Further, the present invention is efficiently applicable to a full-line type recording head which has the length corresponding to the maximum width of a recording medium on which a recording apparatus can perform recording. As such the recording head, either the structure that the maximum width of the recording medium is satisfied by the combination of plural recording heads or the structure that the maximum width is satisfied by a unitedly formed single recording head can be adopted.

In addition, even when such a serial-type recording apparatus as above is used, the present invention is applicable in a case where a recording head fixed to the body of the recording apparatus is used, a case where an exchangeable chip-type recording head capable of being electrically connected to the body of the apparatus and being supplied with ink from the body of the apparatus when this head is mounted on the body of the apparatus is used, or a case where a cartridge-type recording head unitedly having an ink tank on the head itself is used.

Further, it is preferable to add a discharge recovery means, a preparatory discharge means and the like to the structure of the recording apparatus in the present invention, because the effect of the present invention can be further stabilized. As such the means, concretely, a capping means, a cleaning means, a pressurizing/suction means, an electrothermal converter, a heating element other than the electrothermal converter, a preparatory heating element for performing heating by using a combination of these means and elements, a preparatory discharge means for performing discharge irrelative to the recording can be adopted for the recording head.

Further, the kind of mounted head or the number of the mounted heads are not limited to the above. For example, in addition to the structure that only one recording head is provided in correspondence with a monochrome ink, a structure that plural recording heads are provided in correspondence with plural inks respectively having different recording color densities can be adopted. That is, the present invention is of course effective to the recording apparatus which has a recording mode for only a mainstream color such as black or the like, and also quite effective to the recording apparatus which has at least one of a multicolor recording mode for different colors and a full-color recording mode by color mixture. It should be noted that, in the latter case, the recording head may be united in the apparatus, and alternatively the plural recording heads may be combined with others.

Besides, in the above-explained embodiment of the present invention, the ink has been explained as liquid, but an ink which solidifies at a temperature less than the room temperature and softens or liquefies at the room temperature may be used. Further, in the ink-jet method, since it is general to adjust the temperature of the ink itself within the range from 30° C. to 70° C. to adjust the viscosity of the ink to be within the stable-discharge range, it is possible to use an ink which is being liquefied when the recording signal to be used is given. Besides, to positively prevent the temperature rise due to thermal energy by using such the temperature rise as energy to change the state of the ink from a solid state to a liquid state, or to prevent ink evaporation, it is possible to use an ink which solidifies while left and liquefies by heating. In any case, the present invention is applicable to a case where an ink having a characteristic to liquefy for the first time if thermal energy is given. For example, the present invention is applicable to a case where an ink liquefies when thermal energy is given according to a recording signal, whereby the liquid ink is discharged, or to a case where a discharged liquid ink begins already to solidify at the time when the ink reaches a recording medium. The ink in such the cases may have the form as shown in Japanese Patent Application Laid-Open No. 54-56847 or No. 60-71260 that the ink is opposed to the electrothermal converter as being held in the concaves or the penetration pores on the porous sheet as the liquid or solid matter. In the present invention, the most effective method is the method of executing the above film boiling.

Besides, as the form of the ink-jet recording apparatus according to the present invention, the form like a copying machine to which a reader or the like has been incorporated, the form like a facsimile apparatus having a data transmission/reception function, and the like can be adopted in addition to the form used as the image output terminal for an information processing machine such as a computer or the like.

(Other Embodiments)

As described above, the present invention is applicable to a system composed of plural devices (e.g., a host computer, an interface device, a reader, a printer, etc.) or to an apparatus including a single device (e.g., a copying machine, or a facsimile machine).

Figure 7:
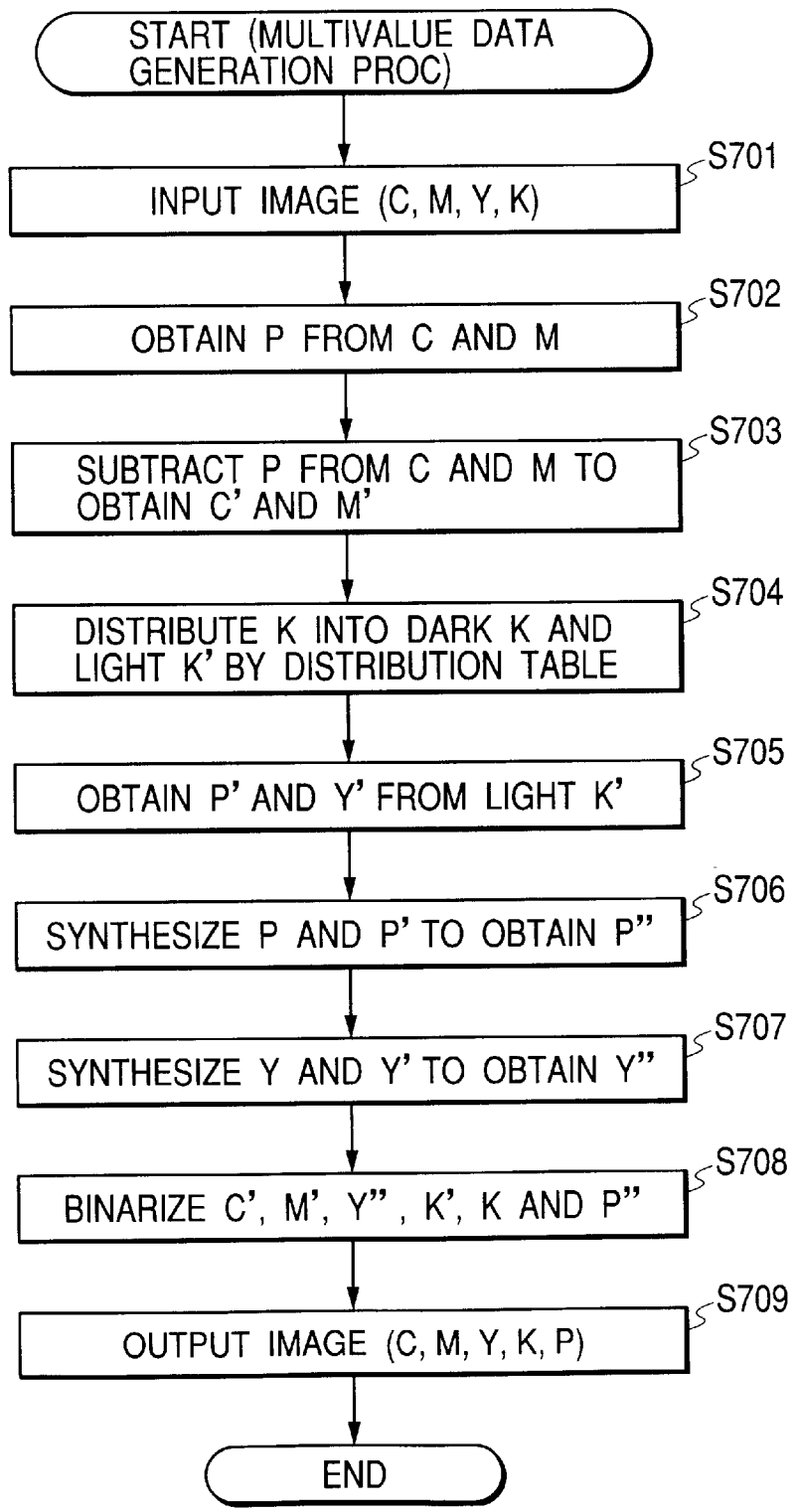
FIG. 7 is a flow chart showing an image process including the generation of the blue ink data according to the first embodiment of the present invention.
Figure 9:
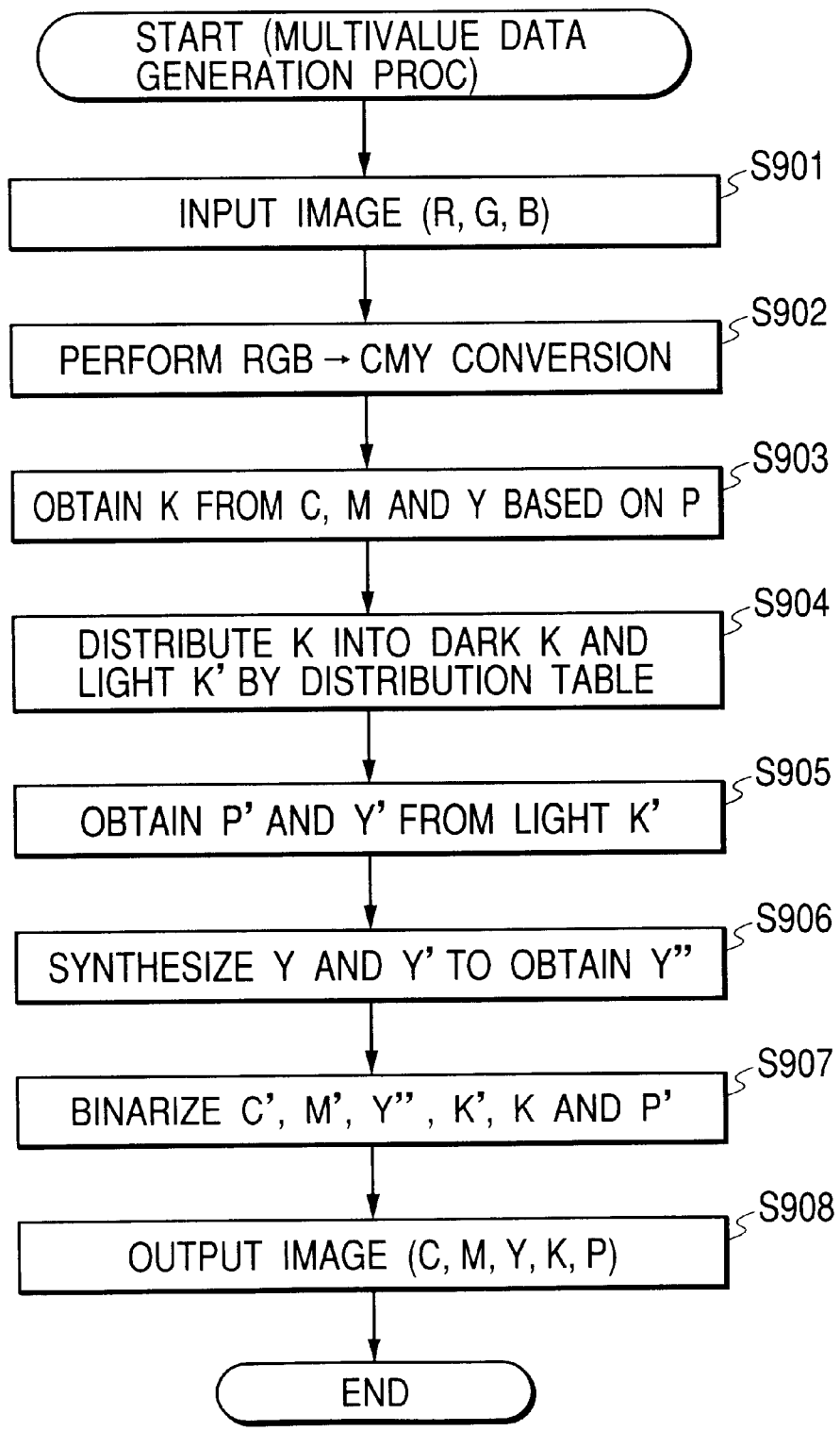
FIG. 9 is a flow chart showing an image process including the generation of the blue ink data according to the second embodiment of the present invention.
Figure 10:
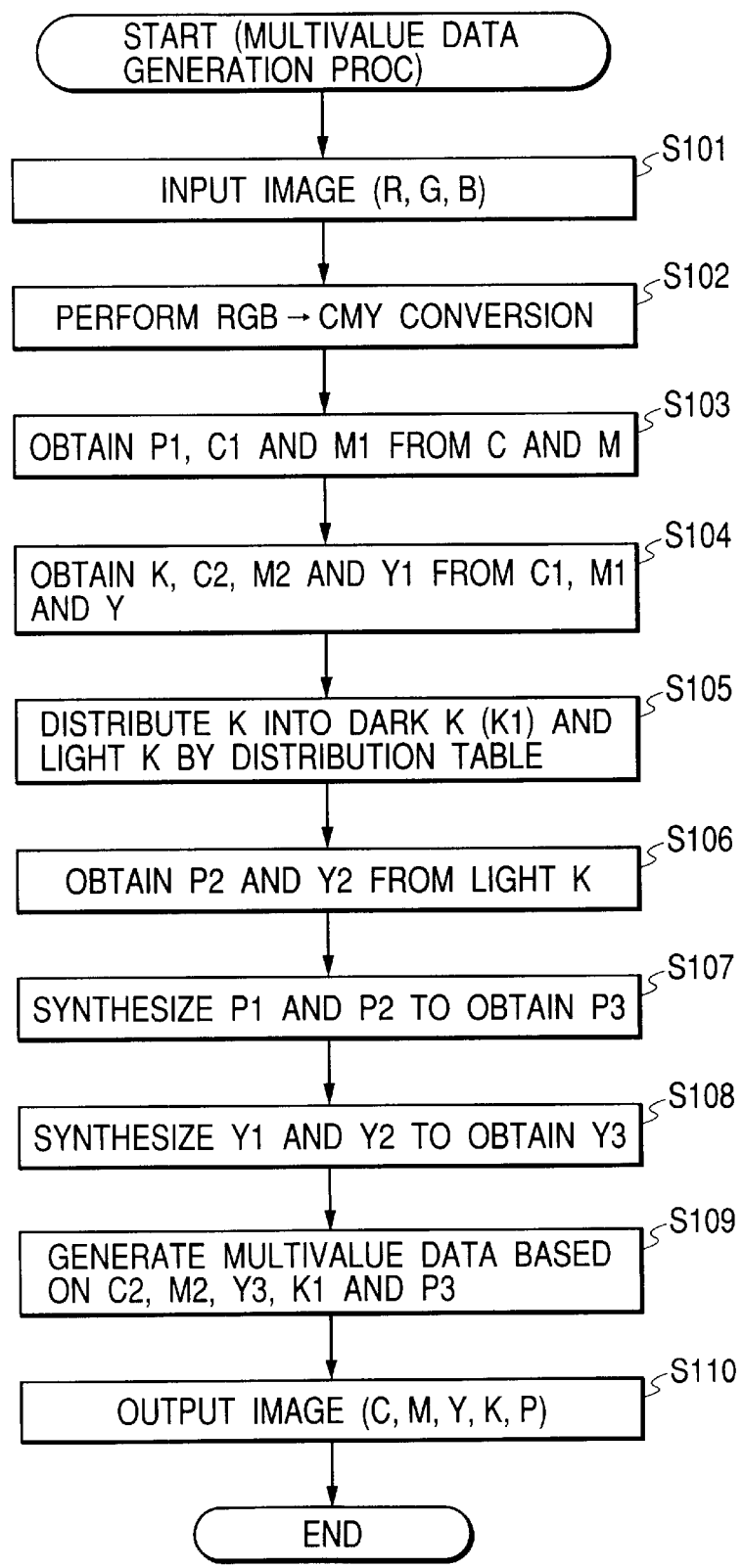
FIG. 10 is a flow chart showing an image process including the generation of the blue ink data according to the third embodiment of the present invention.

Further, the present invention includes a case where program codes of software as shown in FIGS. 7, 9 and 10 to achieve the function of the above embodiment is supplied to a computer (CPU or MPU) in a system or an apparatus connected to various devices so as to operate them to achieve the function of the above embodiment and then the various devices are actually operated based on the program codes supplied and stored in the computer (CPU or MPU) in the system or the apparatus.

In this case, the program codes themselves of the software achieve the function of the above embodiment, whereby the program codes themselves and a means for supplying the program codes to the computer constitute the present invention. For example, a storage medium which stores such the program codes constitutes the present invention.

As the storage medium for storing the program codes, for example, a floppy disk, a hard disk, an optical disk, a magnetooptical disk, a CD-ROM, a magnetic tape, a nonvolatile memory card, a ROM, or the like can be used.

It is needless to say that the present invention includes not only the case where the computer executes the supplied program codes to achieve the function of the above embodiment, but also a case where the supplied program codes cooperate with an OS (operating system) or the like functioning on the computer or with other application software to achieve the function of the above embodiment.

Further, it is needless to say that the present invention further includes a case where the supplied program codes are once stored in a memory provided in a function expansion board inserted in the computer or a function expansion unit connected to the computer, and a CPU or the like provided in the function expansion board or the function expansion unit executes a part or all of the actual process according to instructions of the program codes, thereby realizing the function of the above embodiment.

Hereinafter, examples and a comparative example will be more concretely explained.

EXAMPLE 1

In the example 1, the ink-jet printer performed the printing by using the ink obtained in the image process of the above embodiment and the printability improvement ink. Here, the printer discharges from each head the ink of which quantity is 8.5±0.5P1 at resolution 600 dpi.

Composition of the ink including coloring agents is as follows.

| <prescribed Y ink> | |
|---|---|
| glycerol | 5.0 parts by weight |
| thiodiglycol | 5.0 parts by weight |
| urea | 5.0 parts by weight |
| isopropyl alcohol | 4.0 parts by weight |
| dye (C.I. direct yellow 142) | 2.0 parts by weight |
| water | 79.0 parts by weight |
| <prescribed M ink> | |
| glycerol | 5.0 parts by weight |
| thiodiglycol | 5.0 parts by weight |
| urea | 5.0 parts by weight |
| isopropyl alcohol | 4.0 parts by weight |
| dye (C.I. acid red 289) | 2.5 parts by weight |
| water | 78.5 parts by weight |
| <prescribed C ink> | |
| glycerol | 5.0 parts by weight |
| thiodiglycol | 5.0 parts by weight |
| urea | 5.0 parts by weight |
| isopropyl alcohol | 4.0 parts by weight |
| dye (C.I. direct blue 199) | 2.5 parts by weight |
| water | 78.5 parts by weight |
| <prescribed K ink> | |
| glycerol | 5.0 parts by weight |
| thiodiglycol | 5.0 parts by weight |
| urea | 5.0 parts by weight |
| isopropyl alcohol | 4.0 parts by weight |
| dye (hood black 2) | 3.0 parts by weight |
| water | 78.0 parts by weight |
| <prescribed printability improvement P ink> | |
| polyallylamine basic acid | 5.0 parts by weight |
| benzalkonium chloride | 1.0 parts by weight |
| diethylene glycol | 10.0 parts by weight |
| dye basic blue 47 | 1.0 parts by weight |
| water | 83.0 parts by weight |

Here, a sheet "PB·PAPER" (made by CANON) functioning as a common sheet for electrophotographic printing and ink-jet printing was used as the printing medium.

The printing was performed by using the above coloring agent inks (C, M, Y and K), the printability improvement ink (P) and the printing medium.

FIG. 7 is a flow chart showing the image process and the printing operation based thereon according to the present embodiment, and particularly showing mainly the generation and the binarization of the P ink data.

First, the gradation image data of C, M, Y and K are input in a step S701, and P is obtained from the gradation image data of C and M in a step S702. At this time, the pixel position x indicates the position in the head scan direction, and the pixel position y indicates the position in the printing medium conveying direction, as previously described. Each of the pixel data C(x, y) and M(x, y) of C and M is given by eight-bit data of 256 gradation values.

FIG. 8A is a diagram showing a part of the gradation image data for each pixel, and numerals in the drawing indicate the gradation values of the respective color components. The gradation value "0" indicates the most light part, the gradation value "255" indicates the most dark part, and these parts are represented by eight-bit data.

In this example, a color and an optical reflection density or lightness of the P ink dot on the printing medium has been previously obtained, and, based on such obtained parameters, weighting coefficients s and t and the maximum value of a replacement quantity all used when the gradation image data of C and M are replaced by the data of P have been obtained. Thus, for example, when C is replaced by the P ink, since the color component and the optical reflection density of C are achieved based on such the replacement, the color component (i.e., under color of C) corresponding to the replaced part is eliminated. This process is called an under color removal process of C, a similar process for M is called an under color removal process of M, and the combination of the under color removal processes of C and M is called an under color removal process of P. Concretely, the blue ink is used as the P ink in the present embodiment, whereby this process is called an under blue removal (UBR) process, and the gradation value of the color component subjected to the UBR process is called a UBR value.

The relation in the replacement of the C and M inks by the P ink is as follows.

$$C(i, j)=C'(i, j)+s \times P(i, j)$$

$$M(i, j)=M'(i, j)+t \times P(i, j)$$

(s, t are positive coefficients)

This relation indicates that the color and the optical reflection density in a case where the P dots are subjected to the solid printing of which printing duty is 100% on the printing medium by the printing apparatus at predetermined resolution are the same as those in a case where the C dots are printed at printing duty s×100% and the M dots are printed at printing duty t×100%. Further, the relation indicates that the sum of the UBR values respectively obtained by multiplying the gradation value of P by the respective coefficients s and t and the remaining color components C' and M' in the UBR process is the same as the gradation values of the gradation image data input for C and M (see FIGS. 4A to 4C).

In a step S703, C'(i, j) and M'(i, j) are obtained by the following expressions given from the above relation.

$$C'(i, j)=C(i, j)-s \times P(i, j)$$

$$M'(i, j)=M(i, j)-t \times P(i, j)$$

By the process of the above steps S702 and S703, for example, if each of s and t is 1, for the pixel (i, j) shown in FIG. 8A, C(i, j)=56 and M(i, j)=94 are given. Thus, based on such the gradation image data, P(i, j)=56, C'(i, j)=0 and M'(i, j)=38 are generated as shown in FIG. 8B. Similarly, the gradation image data of P, C' and M' are generated from the gradation image data of C and M sequentially for the pixels (i+1, j), (i+2, j), . . . , (i+1, j+1). . . .

In this example, the coefficients s and t are given as s=1.00 and t=1.00. It should be noted that, as described above, the coefficients s and t have been set as the weighting coefficients on the basis of the maximum optical reflection density of the P ink and the tint of the dots formed by the P ink.

Next, in a step S704, the black (K) data is distributed into the light and dark black data by using the dark/light distribution table. Then, in a step S705, the data P' of the P ink and the yellow data Y' are given on the basis of the light black data K' obtained in the above dark/light distribution process.

Then, P and P' are synthesized to obtain P" in a step S706, and Y and Y' are synthesized to obtain Y" in a step S707.

Next, in a step S708, the thus obtained C', M', Y", K, K' and P" are respectively binarized in the error diffusion method. Further, in a step S709, the ink dots are formed on the printing medium by the printer shown in FIG. 1 to output the print. It should be noted that, in the printing, evaluation of this example (including the following comparison example) was performed by using an image based on a SCID (Standard Color Image Data) N1 (ISO300).

As described above, according to the present embodiment, by forming the blue dots instead of the cyan and magenta dots, the graininess in the low-density part or the light part can be reduced. Further, by using the blue ink instead of the light black ink capable of reducing the graininess, it is possible to prevent that the apparatus becomes large in size because the new kind of ink is independently used. Also, it is possible to perform printing that the total number of printing dots can be reduced, by a simple process.

It should be noted that the image process explained in the above embodiment or the above example need not necessarily be performed by the printer. For example, the above image process may be performed as a process by a printer driver in a personal computer used as the host for the printer, and the printing apparatus can perform only the printing by receiving the above various data obtained in the process of the host.

Comparative Example 1

Instead of the process explained in the above example 1, ordinary printing of C, M, Y and K dots was performed by using the printer used in the example 1. As a result, the graininess partially appeared in the cyan and magenta dots or the black dots in the light part (low-density part) on the printed image. Further, bleeding partially appeared in the dark part (high-density part) due to too-much ink discharge.

EXAMPLE 2

In this example, the black (K) data is generated by C, M and Y print generation. At this time, an under color removal coefficient used in the above print generation is determined so that the lightness of the supposed light black dots distributed from K matches with the lightness of the blue ink (P ink) dots. Thus, the P and Y data respectively correlated with the C and M and the light black data can be generated by one-time process.

As shown in FIG. 9, the input data represented by R, G and B data (step S901 ) is converted into C, M and Y data (step S902). Next, as described above, in consideration of the lightness of the P ink dot, the K data is generated from the C, M and Y data (step S903). At this time, it should be noted that C, M and Y obtained by the under color removal respectively have the same meanings as those of C', M' and Y' shown in the example 1.

The following processes can be performed in the same manner as in the above example 1. Further, it should be noted that the structures of the printer and the like are the same as those in the example 1.

EXAMPLE 3

This example is the modification of the above example 2. That is, the process to obtain the black data from C, M and Y as correlating it with the P ink is performed by two stages. In other words, in a step S103 shown in FIG. 10, in consideration of the lightness of the P ink dot, P1, C1 and M1 data are obtained based on the C and M data in the UBR process in the same manner as in the example 1. Further, in a step S104, K, C2, M2 and Y1 are generated by the print generation from C1 and M1 obtained in the step S103.

The following processes can be performed in the same manner as in the above example 1. Further, it should be noted that the structures of the printer and the like are the same as those in the example 1.

EXAMPLE 4

In this example, the ink-jet printer, the coloring agent inks, the P ink and the printing medium all the same as those in the above example 1 are used. However, the image process is different from that in the example 1. That is, the following image process is performed to generate the gradation image data of the blue ink (P ink) based on the C and M data.

FIG. 11A exemplifies a part of the gradation image data. As well as the explanation for FIGS. 8A and 8B, numerals shown in FIG. 11A indicate the gradation values of the respective color components. Here, the gradation value "0" indicates the most light part, the gradation value "255" indicates the most dark part, and these parts are represented by eight-bit 256-value data.

In these data, as well as the example 1, the gradation image data of the P ink is generated as shown in FIG. 11B for the pixel (i, j) in accordance with the weighting coefficients s and t used when the gradation image data of C and M are replaced by the P ink data. Similarly, the gradation image data of P is generated based on the gradation image data of C and M sequentially for the pixels (i+1, j), (i+2, j), . . . , (i+1, j+1), . . . . It should be noted that, also in this example, the coefficients s and t are given as s=1.00 and t=1.00.

Next, differently from the example 1, the gradation image data of P is binarized in the error diffusion method to obtain the result shown in FIG. 11C.

Concretely, in the example of FIG. 11C, P(i, j)=1 (indicating dots of one-bit signal are formed), P(i+1, j)=0, P(i, j+1)=0, and P(i+1, j+1)=0 are given. It should be noted that the signal of P=1 is represented as the eight-bit value 255 which is the value obtained by so-called predetermined mapping conversion (later described).

Next, the predetermined mapping conversion is performed to the printing image data (binary) of P. That is, when the binary data is "1", the data is mapped to (or matched with, or made correspondent to) "255" in eight bits, and when the binary data is "0", the data is mapped to "02" in eight bits. Then, C' (i, j) and M' (i, j) are obtained by the following expressions on the basis of the P data after the mapping conversion.

$$C'(i, j)=C(i, j)-p \times P(i, j)$$

$$M'(i, j)=M(i, j)-q \times P(i, j)$$

(p, q are positive coefficients)

As a result, as shown in FIG. 11D, in the pixel (i, j) where the binary data of P is "1" ("255" in eight bits), C'(i, j)=−199 and M'(i, j)=−161 are given. Here, it should be noted that, in this example, the calculation is performed based on P=q=1 for simplification. Thus, the data of P is binarized beforehand, and its mapped eight-bit value is made "255" or "0", whereby the values of C' and M' are given as "0" or a negative value when C' and M' are generated by subtracting the value of P. Thus, the gradation value data of C' and M' to be binarized in a next binarization process is as shown in FIG. 11E. That is, in FIG. 11E, the gradation value data is converted into the binary data "0" even if what kind of pseudo-gradation process is performed. As a result, the cyan ink dot and the magenta ink dot are never formed in the pixel where the P (blue) ink dots are formed, whereby it is possible to prevent that the graininess which originates the fact that the cyan and magenta dots exist appears.

Next, the C', M', Y and K data obtained as above are binarized in the error diffusion method, and the binarized result is shown in FIG. 11E.

Further, the ink dots are formed on the printing medium on the basis of the binary data obtained as above, thereby outputting the print.

According to this example, as well as the example 1, the graininess can be reduced by forming the blue dots instead of the cyan and magenta dots, and the total number of the dots to be printed can be reduced by the simple and easy process. Also, according to this example, since the cyan ink dot and the magenta ink dot are never formed in the pixel where the blue ink dots are formed, the graininess can further be reduced effectively.

Further, it should be noted that, as an example of the blue (P) ink and other inks, a cationic dye is used as the coloring agent for the blue ink, and a combination including an anionic dye may be used as the coloring agents for other color inks.

As described above, the printing data of the secondary color is generated for the predetermined two coloring agents among the plural different kinds of coloring agents used in the printing apparatus, the printing data in which the part of the printing data of the predetermined two coloring agents has been replaced by the generated printing data of the secondary color is generated, the printing data is generated at least to use the above secondary color instead of the light black coloring agent (i.e., the black coloring agent of which black density is low), and the printing is performed on the basis of these generated printing data. Therefore, even if the data to be printed should be essentially printed by using the dots formed by the predetermined two coloring agents, at least the part of such the printing can be performed by using the secondary color. Further, the area which should be essentially printed by the light black coloring agent can be printed by the above secondary color. Thus, particularly in the low-density part or the high-lightness part of the image to be printed, it is possible to reduce the area where the dots of the predetermined coloring agents are formed mutually biasedly. Also, the secondary color can be substituted in the printing of the light black part of the image.

As a result, the graininess appeared on the printed image can be effectively reduced by the simple structure.

What is claimed is:

1. An image processing method which generates, based on data to be printed, printing data of plural different coloring agents used in a printing apparatus, said method comprising:

a step of generating first data of a secondary color for predetermined two of the plural different coloring agents based on the data to be printed, generating second data of the secondary color based on printing data of light black obtained for a black coloring agent being one of the plural different coloring agents, and thus generating printing data of the secondary color by synthesizing the first data and the second data; and a step of generating printing data in which at least a part of the printing data of the predetermined two coloring agents has been replaced by the generated printing data of the secondary color.

2. A method according to claim 1, further comprising a step of generating data of the other one of the plural different coloring agents when the printing data of the secondary color is generated, and also generating printing data of the coloring agent by synthesizing the data of the other one coloring agent and its corresponding printing data.

3. A method according to claim 2, wherein, in the process of generating the printing data of the secondary color, the process of generating the first data of the secondary color is performed by under color removal in which the coloring agent of the secondary color generated based on the second data of the secondary color is considered, whereby the synthesized printing data of the secondary color is generated.

4. A method according to claim 2, wherein, in said step of generating the printing data of the predetermined two coloring agents, the printing data of the predetermined two coloring agents is generated on the basis of black print generation for generating black printing data based on the data of the predetermined two coloring agents generated by under color removal of the secondary color together with the process of generating the first data of the secondary color.

5. A method according to claim 2, wherein lightness on print by the coloring agent of the secondary color is higher than lightness on print using the predetermined two coloring agents.

6. A method according to claim 2, wherein the predetermined two coloring agents are coloring agents of two of three primary colors necessary in color printing.

7. A method according to claim 2, wherein the coloring agent is an ink.

8. A method according to claim 7, wherein the coloring agent of the secondary color is a cationic dye, and the other coloring agent is an anionic dye.

9. A method according to claim 2, wherein, in said step of generating the printing data of the predetermined two coloring agents, n-value first printing data of the secondary color is generated for the predetermined two coloring agents on the basis of m-value data to be printed (m>n; m and n are integers), the generated n-value first printing data of the secondary color is made correspondent to the m-value data, and the n-value printing data of the predetermined two coloring agents are generated on the basis of the data obtained by subtracting the correspondent m-value data of the secondary color from the m-value data of the predetermined two coloring agents.

10. A method according to claim 9, wherein lightness on print by the coloring agent of the secondary color is higher than lightness on print using the predetermined two coloring agents.

11. A method according to claim 10, wherein the predetermined two coloring agents are coloring agents of two of three primary colors necessary in color printing.

12. A method according to claim 11, wherein the coloring agent is an ink.

13. A method according to claim 12, wherein the coloring agent of the secondary color is a cationic dye, and the other coloring agent is an anionic dye.

14. A printing apparatus which performs printing on the basis of printing data of plural different coloring agents generated based on data to be printed, said apparatus comprising:

printing means for performing the printing of respective colors by using the plural different coloring agents, on the basis of the printing data; and supply means for supplying, to said printing means, the printing data which is generated by a secondary color generation process of generating first data of a secondary color for predetermined two of the plural different coloring agents based on the data to be printed, generating second data of the secondary color based on printing data of light black obtained for a black coloring agent being one of the plural different coloring agents, and thus generating printing data of the secondary color by synthesizing the first data and the second data, and a data generation process of generating printing data in which at least a part of the printing data of the predetermined two coloring agents has been replaced by the generated printing data of the secondary color.

15. An apparatus according to claim 14, wherein data of the other one of the plural different coloring agents is generated when the printing data of the secondary color is generated, and printing data of the coloring agent is generated by synthesizing the data of the other one coloring agent and its corresponding printing data.

16. An apparatus according to claim 15, wherein, in the process of generating the printing data of the secondary color, the process of generating the first data of the secondary color is performed by under color removal in which the coloring agent of the secondary color generated based on the second data of the secondary color is considered, whereby the synthesized printing data of the secondary color is generated.

17. An apparatus according to claim 15, wherein, in the process of generating the printing data of the predetermined two coloring agents, the printing data of the predetermined two coloring agents is generated on the basis of black print generation for generating black printing data based on the data of the predetermined two coloring agents generated by under color removal of the secondary color together with the process of generating the first data of the secondary color.

18. An apparatus according to claim 15, wherein, in the process of generating the printing data of the predetermined two coloring agents, n-value first printing data of the secondary color is generated for the predetermined two coloring agents on the basis of m-value data to be printed (m>n; m and n are integers), the generated n-value first printing data of the secondary color is made correspondent to the m-value data, and the n-value printing data of the predetermined two coloring agents are generated on the basis of the data obtained by subtracting the correspondent m-value data of the secondary color from the m-value data of the predetermined two coloring agents.

19. An apparatus according to claim 14, wherein lightness on print by the coloring agent of the secondary color is higher than lightness on print using the predetermined two coloring agents.

20. An apparatus according to claim 14, wherein the predetermined two coloring agents are coloring agents of two of three primary colors necessary in color printing.

21. An apparatus according to claim 14, wherein the coloring agent is an ink.

22. An apparatus according to claim 21, wherein said printing means includes a head, for each of the plural coloring agents, for discharging an ink to perform the printing.

23. An apparatus according to claim 22, wherein said head generates bubbles in the ink by using thermal energy, and discharges the ink by pressure of the generated bubbles.

24. An apparatus according to claim 21, wherein the coloring agent of the secondary color is a cationic dye, and the other coloring agent is an anionic dye.

25. A storage medium which stores a program readable by an information processing apparatus, wherein said program executes an image process of generating, based on data to be printed, printing data of plural different coloring agents used in a printing apparatus, said process comprising:

a step of generating first data of a secondary color for predetermined two of the plural different coloring agents based on the data to be printed, generating second data of the secondary color based on printing data of light black obtained for a black coloring agent being one of the plural different coloring agents, and thus generating printing data of the secondary color by synthesizing the first data and the second data; and a step of generating printing data in which at least a part of the printing data of the predetermined two coloring agents has been replaced by the generated printing data of the secondary color.

* * * * *

UNITED STATES PATENT AND TRADEMARK OFFICE
CERTIFICATE OF CORRECTION

PATENT NO.     : 6,530,638 B2                                                    Page 1 of 1
DATED          : March 11, 2003
INVENTOR(S)    : Tsuyoshi Shibata et al.

It is certified that error appears in the above-identified patent and that said Letters Patent is hereby corrected as shown below:

<u>Column 5,</u>
Line 58, "21-2, 21-2," should read -- 21-2, 21-3, --.

<u>Column 9,</u>
Line 35, "doted" should read -- dotted --.

Signed and Sealed this

Sixteenth Day of December, 2003

JAMES E. ROGAN
*Director of the United States Patent and Trademark Office*